United States Patent [19]

Castaneda et al.

[11] Patent Number: 5,436,088
[45] Date of Patent: Jul. 25, 1995

[54] BATTERY CRADLE

[75] Inventors: Julio C. Castaneda, Coral Springs, Fla.; Stuart A. Heilsberg, Arlington Heights; Joseph R. Rauch, Cary, both of Ill.

[73] Assignee: Motorola, Inc., Schaumburg, Ill.

[21] Appl. No.: 236,803

[22] Filed: May 2, 1994

[51] Int. Cl.⁶ .................................. H01M 2/10
[52] U.S. Cl. ........................... 429/96; 423/123
[58] Field of Search ............ 429/121, 123, 125, 163, 429/96, 97, 98

[56] References Cited

U.S. PATENT DOCUMENTS

| | | | |
|---|---|---|---|
| 4,184,007 | 1/1980 | Urry | 429/101 X |
| 4,469,765 | 9/1984 | McCartney et al. | 429/163 X |
| 4,873,160 | 10/1989 | Miyazaki et al. | 429/100 X |
| 4,880,712 | 11/1989 | Gordecki | |
| 5,180,644 | 1/1993 | Bresin et al. | 429/121 X |
| 5,298,347 | 3/1994 | Aksoy et al. | 429/163 X |

OTHER PUBLICATIONS

Fred W. Billmeyer, Jr. *Textbook of Polymer Science*, 2nd edition, Wiley-Interscience 1971.

*Primary Examiner*—Stephen Kalafut
*Assistant Examiner*—Carol Chaney
*Attorney, Agent, or Firm*—Andrew S. Fuller

[57] ABSTRACT

A battery cradle (130) is provided for securing a battery (117) within a battery compartment (120). The battery cradle (130) includes a frame member (131) having a cavity (141) to receive the battery (117). The frame member (131) is formed to fit a portion of the battery compartment (120) and has a peripherally located seal (146) to seal the battery compartment (120).

18 Claims, 3 Drawing Sheets

BATTERY CRADLE

TECHNICAL FIELD

This invention relates in general to battery-powered electronic devices, and more particular, to a battery compartment for an electronic device.

BACKGROUND

Many battery-powered portable electronic devices have user-accessible internal compartments for housing one or more batteries. Generally, the batteries are mechanically secured within the compartment and electrically coupled to the internal circuitry of the device. In some applications mechanical specifications require good environmental weathering and shock resistance. The battery and battery compartment are potential problem areas for meeting these specifications. This is particularly true in devices having high density battery packs, which represent a significant percentage of the total weight of the radios. Examples of such devices include high power portable radios.

Some prior art radios have batteries loosely fitted within the battery compartment which may be optionally secured with a battery compartment cover. Sometimes, the battery compartment is formed to properly locate and position the battery. However, such configurations may not meet specification requirements for protection against environmental elements and for shock resistance. For example, water, dust, and other environmental contaminants may penetrate the radio housing through the battery compartment to damage sensitive internal electrical components within the radio. Additionally, when subjected to a severe shock, such as the impact resulting from a dropped radio, a loosely fitted battery may shift around and disengage from battery contacts or cause damage to itself or portions of the radio. Hence, it is important to properly secure the battery in such applications.

There exists a need for a battery support structure within an internal battery compartment of an electronic device which secures the battery which provides improved protection for the electronic device and its internal components.

DETAILED DESCRIPTION OF THE PREFERRED EMBODIMENT

Generally, the present invention provides for a battery cradle for securing a battery within the battery compartment of an electronic device. The battery cradle functions as a shock absorber for the battery, a seal for the battery compartment, and support for battery terminal contacts. The cradle protects the battery pack and internal components of the electronic device from damage potentially caused by the shock of a severe impact. Additionally, the cradle protects against penetration of environmental contaminants through the battery compartment into the internal structure of the electronic device.

Figure 1:
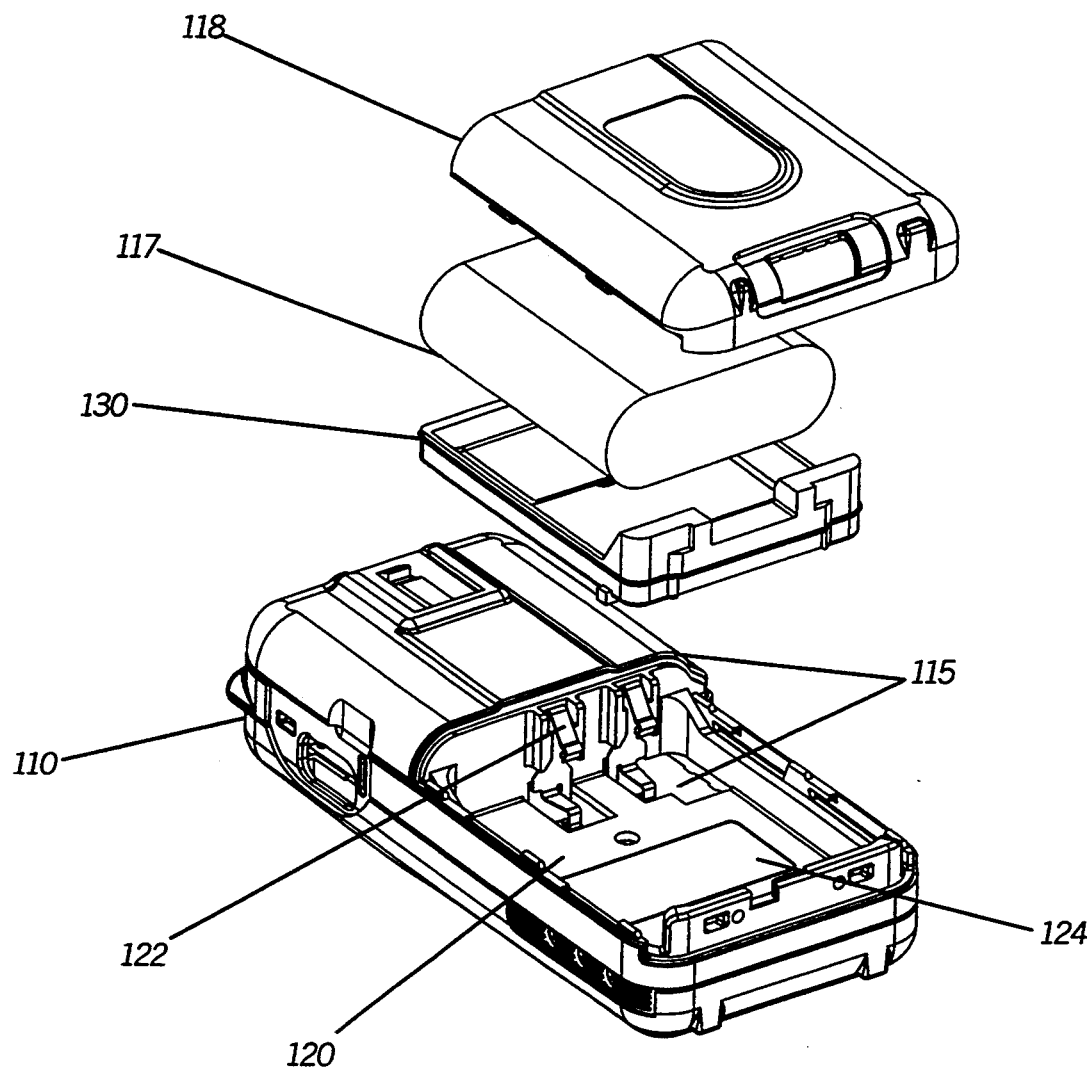
FIG. 1 is a perspective view showing a first surface of a battery cradle, in accordance with the present invention.

FIG. 1 is an exploded perspective view of an electronic device assembly 100, in accordance with the present invention. The electronic device assembly 100 is a portable radio capable of two-way communications. The radio 100 includes a radio housing 110 which has a main radio portion or compartment 115 and a battery compartment 120. The main radio compartment 115 houses communication circuitry for communicating over radio frequency channels. The communication circuitry includes internal electrical components (not shown) which must be protected from mechanical stresses, and from contaminants such as moisture, dust, chemicals, etc. The battery compartment 120 includes a removable battery cradle or tray 130, which receives and positions a battery or battery pack 117. The battery compartment cover 118 encloses the battery compartment 120 and secures the battery 117 within the battery compartment 120. Battery contacts 122 provide electrical coupling between the internal circuitry of the radio 100 and the battery 117. The battery compartment 120 also includes a label area 124 for providing identification information for the radio 100.

According to the present invention, the battery cradle 130 provides a frame for receiving and securely positioning the battery pack 117 within the battery compartment 120. The battery cradle 130 also functions as a seal for the battery compartment 120 to prevent the entry of environmental contaminants into the radio compartment 115 via the battery compartment 120. The battery cradle 130 further functions as a shock absorber for reducing the likelihood of damage to the battery 117, battery compartment 120 or radio 100 when the radio 100 is subjected to high impact energy as might occur when the radio 100 is dropped.

Figure 2:
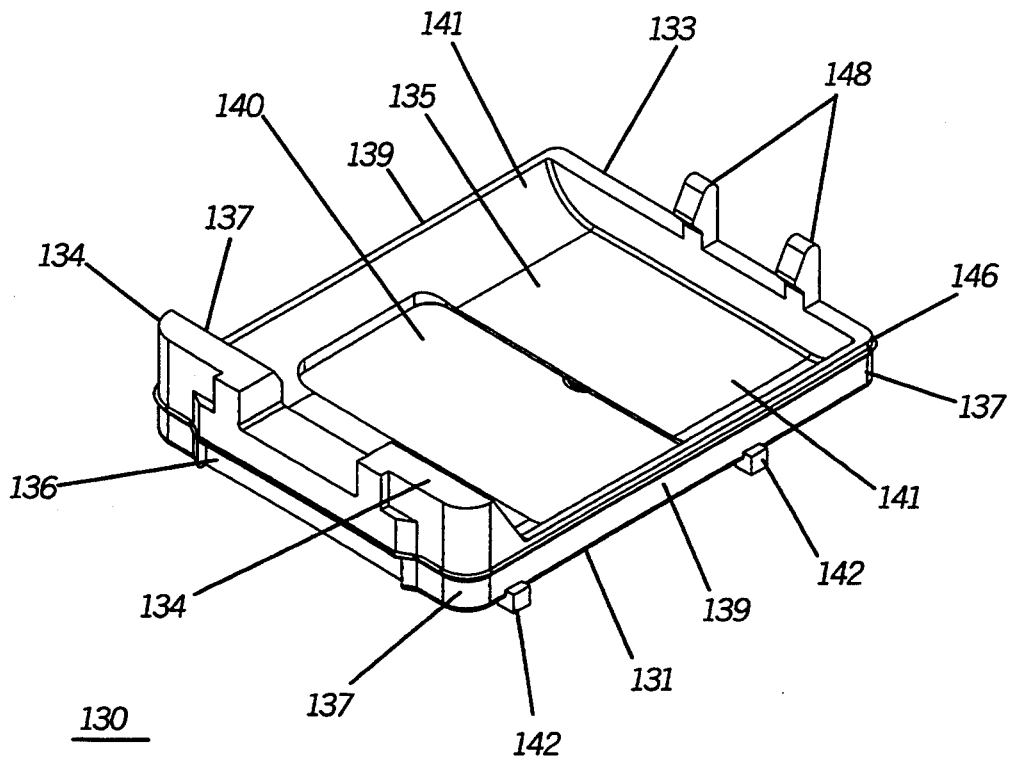
FIG. 2 is a perspective view showing a second surface of the battery cradle of FIG. 1.
Figure 3:
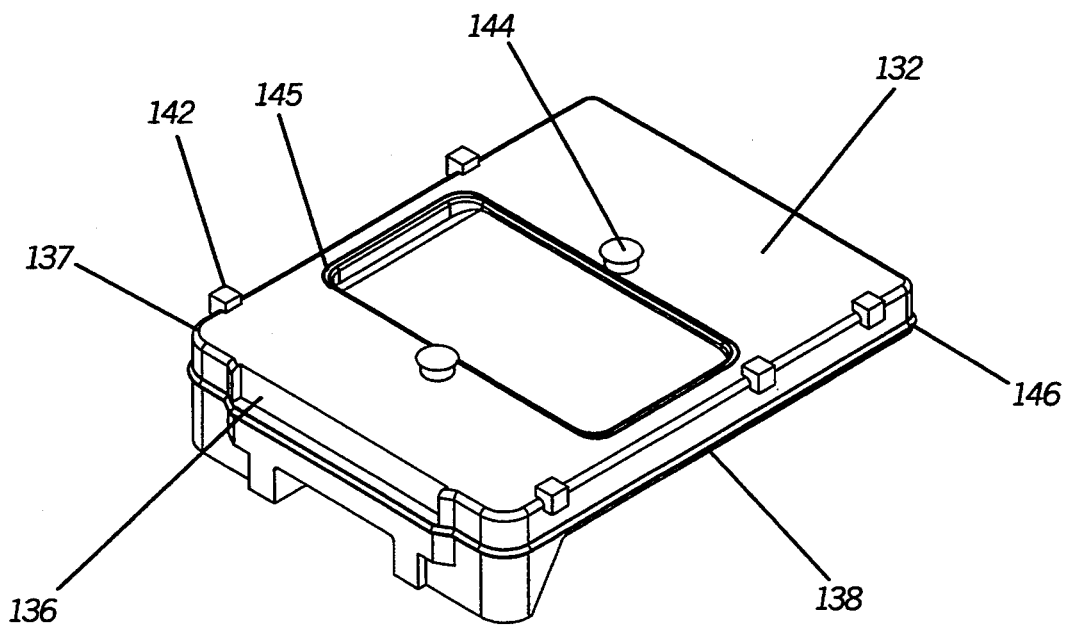
FIG. 3 is an exploded perspective view of an electronic device assembly, in accordance with the present invention.

FIGS. 2 and 3 are perspective views of the battery cradle 130, in accordance with the present invention. FIG. 2 is a first orientation showing the top surface 134 of the battery cradle 130 and FIG. 3 is a second orientation showing the bottom surface 132. Referring to FIGS. 2 and 3, the battery cradle 130 includes a frame member or structure 131, having additional functional elements formed thereon. The battery cradle 130 is formed from a resilient and flexible shock absorbing material, such as butyl or other thermoset rubber materials. The butyl rubber cradle 130 absorbs primary and secondary impacts of the battery 117 when the radio 100 is dropped. Selected portions 137 of the cradle 130 are reinforced or thickened as needed for additional shock resistance. The frame member 131 comprises a rectangular structure having a base portion 135 with four depending side walls 133, 134, 139, including a rear side wall 133 and a relatively thick front side wall 134. The base portion 135 and side walls 133, 134, 139 define a cavity 141, or recessed area, for receiving the battery 117 or a portion thereof. The cavity 141 is formed such that at least a portion of the battery 117 can be snugly fitted within the cavity 141. The frame member 131 house includes a cut-out section 140 to facilitate the viewing a label within the label area 124 of the battery compartment 120 when the battery cradle 130 is installed within the battery compartment 120. A raised or ribbed portion 145 extends along the perimeter of the label opening or cut-out section 140 along the bottom surface 132 of the battery cradle 130. This raised portion 145 provides a low-force feather seal for the label opening 140 between the cradle 130 and the battery compartment 120.

The frame member 131 also includes an integrally formed peripherally located seal 146. The seal 146 is formed by a rib or raised portion protruding peripherally along the frame member 131. The frame member 131, including the peripheral seal 146, functions to seal the battery compartment 120 such that water, dust, or other environmental elements do not penetrate the internal compartment of the radio 100 through the battery compartment 120. Mount aids 142, 144, including feet 142 and retainers or fasteners 144, are present on the bottom surface 132 of the battery cradle 130 and along the sides. These mount aids 142, 144 help in positioning and securing the battery cradle 130 within the battery compartment 120. Additionally, an integral snap groove 136 situated on the exterior of the front side wall 134 functions as a mount guide for positioning the battery cradle 130 within the battery compartment 120. In the radio 100 of the preferred embodiment, the battery contacts 122 are hook-shaped spring contacts which must properly engage terminals on the battery 117 to provide electrical coupling between the battery 117 and the internal circuitry of the radio 100. The frame member 131 includes battery contact supports or bumpers 148 formed to engage and securely position the battery contacts 122. The contact bumpers 148 extend from the rear side wall 133 of the frame member 131.

Figure 4:
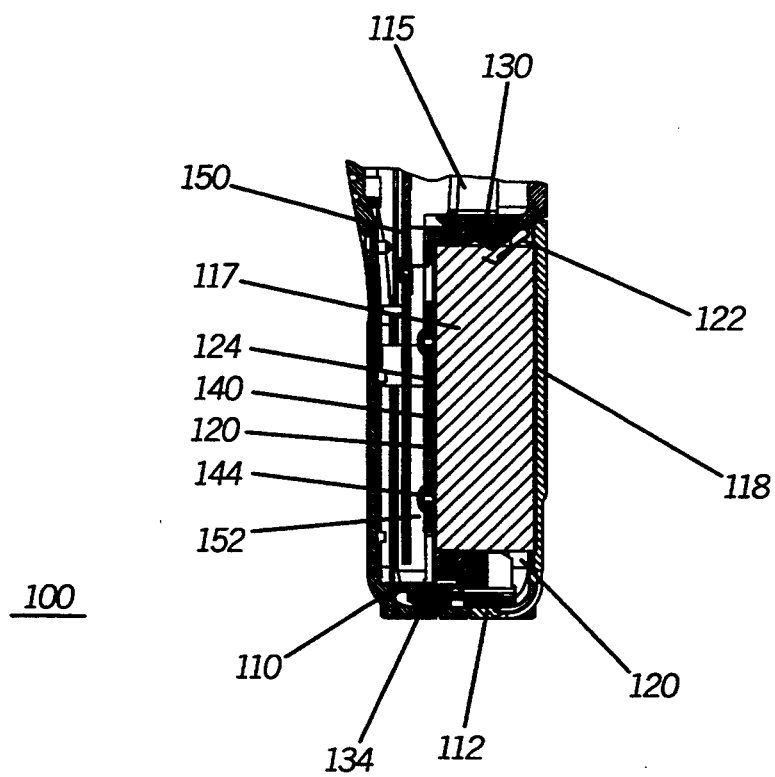
FIG. 4 is a fragmentary cross-sectional view of the electronic device assembly of FIG. 3.

FIG. 4 shows a fragmentary cross-sectional view of the radio 100 assembly. When fully assembled, the battery cradle 130 is positioned such that the label cut-out section 140 of the battery cradle 130 is positioned over the label area 124 within the battery compartment 120. Accordingly, a label positioned within the label area 124 is visible through the battery cradle 130 when the battery 117 is not installed within the battery compartment 120. Additionally, the thick front side wall 134 is positioned against the bottom portion 112 of the radio 100. The cradle 130 is secured within the battery compartment 120 by engaging the integral mount fasteners 144 to corresponding structural members 152 of the battery compartment 120. Additionally, the battery contact supports 148 are positioned about the battery contacts 122 to securely position the battery contacts 122 and to keep the contacts 122 from yielding when the radio 100 unit is dropped or otherwise stressed. When the battery 117 is installed in the battery cradle 130 and secured by the battery compartment cover 118, a snug fit is provided between the battery 117, the battery cradle 130, and the battery compartment 120. Consequently, the battery 117 compresses the battery cradle 130 such that the peripheral seal 146 of the battery cradle 130 seals the battery compartment 120 from the main radio compartment 115 thereby protecting the internal components 150 of the radio 100.

The present invention offers significant advantages over battery housing configurations of the prior art. The battery cradle 130, including the peripheral seal 146 and contact bumpers 148, can be molded into a single piece part, as in the preferred embodiment, thus facilitating the manufacturing process. The integral snap groove 136 and mount fasteners 144 facilitate the assembly of the battery cradle 130 within the battery compartment 120. The use of butyl or other similar shock absorbing material provide impact protection for the battery 117, the battery compartment 120, and the electronic device, which might result from a high impact drop of the electronic device. Moreover, by providing the peripheral seal 146, the entry of environmental contaminants such as water, dust and the like, through the battery compartment 120 into the internal compartment of the electronic device 100 is restricted.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery cradle for securing a battery within a battery compartment, comprising:
 a frame member formed to fit a portion of the battery compartment, the frame member having a base and depending sidewalls, the base and depending sidewalls defining a recessed area to receive the battery; and
 a seal integrally formed on the frame member and being peripherally located on the frame member;
 wherein the frame member functions as a cradle for the battery and a seal for the battery compartment.

2. The battery cradle of claim 1, wherein the frame member has fasteners integrally formed on the base to secure the battery cradle within the battery compartment.

3. The battery cradle of claim 1, wherein the seal comprises a rib protruding peripherally on the frame member.

4. The battery cradle of claim 1, further comprising a protruding battery contact bumper integrally formed on the frame member.

5. The battery cradle of claim 1, wherein the frame member is formed from a shock absorbing material.

6. The battery cradle of claim 5, wherein the shock absorbing material comprises butyl rubber.

7. The battery cradle of claim 1, wherein the frame member has an opening extending through a portion of the base such that a portion of the battery compartment is visible through the opening when the battery cradle is mounted within the battery compartment.

8. The battery cradle of claim 1, wherein the frame member has a snap groove integrally formed thereon.

9. A battery cradle for securing a battery within a battery compartment, comprising:
 a one-piece molded resilient frame member formed from a shock absorbing material to fit a portion of the battery compartment, the frame member having a recessed area to receive the battery, the frame member having an integrally formed, peripherally located seal for sealing the battery compartment, the frame member having selected portions thereof thickened to provide enhanced shock resistance, the frame member having integrally formed fasteners to secure the battery cradle within the battery compartment.

10. The battery cradle of claim 9, further comprising a battery contact support integrally formed on the frame member.

11. The battery cradle of claim 9, wherein the frame member has a snap groove integrally formed thereon.

12. An electronic device assembly, comprising:
 a housing having a battery compartment; and
 a battery cradle mounted within the battery compartment, the battery cradle comprising:

a one-piece resilient frame member formed from a shock absorbing material to fit a portion of the battery compartment, the frame member having a base and depending sidewalls defining a recessed area to receive a battery, the frame member having an integrally formed peripherally located seal that seals the battery compartment, the frame member having integrally formed fasteners securing the battery cradle within the battery compartment.

13. The electronic device assembly of claim 12, further comprising:
   a battery contact mounted within the battery compartment; and
   a battery contact support integrally formed on the frame member and positioned to engage and support the battery contact.

14. The electronic device assembly of claim 12, wherein:
   the battery compartment has a label area formed therein; and
   the frame member has an opening within a portion of the base to enable viewing of the label area through the frame member.

15. A battery cradle for securing a battery within a battery compartment, comprising:
   a resilient frame member formed from a shock absorbing material and formed to fit a portion of the battery compartment, the frame member having a base and depending sidewalls defining a recessed area to receive the battery;
   a plurality of fasteners formed on the base;
   a protruding battery contact bumper integrally formed on one of the sidewalls; and
   a rib seal integrally formed on the frame member and being peripherally located on the frame member;
   wherein the frame member functions as a cradle for the battery and a seal for the battery compartment.

16. The battery cradle of claim 15, wherein the frame member has an opening extending through the base such that a portion of the battery compartment is visible through the opening when the battery cradle is mounted within the battery compartment.

17. The battery cradle of claim 15, wherein the frame member, fasteners, the battery contact bumper, and the rib seal are molded into a single piece part.

18. An electronic device assembly, comprising:
   a housing having a battery compartment;
   a battery contact mounted within the battery compartment;
   a label area formed within the battery compartment; and
   a battery cradle mounted within the battery compartment, the battery cradle comprising:
      a resilient frame member formed from shock absorbing material and formed to fit a portion of the battery compartment, the frame member having a base and depending sidewalls defining a recessed area to receive the battery, the frame member having an opening to enable viewing of the label area through the frame member;
      a plurality of fasteners formed on the base, and at least partially securing the frame member to the battery compartment;
      a protruding battery contact bumper integrally formed on one of the sidewalls and positioned to engage and support the battery contact; and
      a seal integrally formed on a periphery of the frame member, the seal providing a snug fit between the frame member and the battery compartment.

* * * * *